United States Patent Office 2,935,409
Patented May 3, 1960

2,935,409

POWDERED ALGINATE JELLY COMPOSITION AND METHOD OF PREPARING THE SAME

Richard Henry McDowell and James Leo Boyle, London, England, assignors to Alginate Industries Limited, London, England No Drawing. Application October 25, 1957
Serial No. 692,260

Claims priority, application Great Britain
November 12, 1956

13 Claims. (Cl. 99—131)

This invention comprises improvements in or relating to gel products and has particular reference to gel products made from milk.

Various mixtures have been proposed which will stiffen or gel milk without the need for heat. The most widely used of these are based on modified starches, but they have the disadvantage of a rather sticky texture, and further they cannot be turned out of a mold to give a pudding having the shape of the mold. Various alginate preparations have also been used, but have one or more of the following disadvantages:

(a) They contain alkali phosphates which give an undesirable flavor;

(b) They are not suitable for making up into a pudding intended to be turned out of a mold;

(c) Two-stage mixing procedure is necessary.

We have now found that using a preparation containing alginate with such properties and with such added substances as hereinafter described it is possible by dissolving such a preparation directly in cold milk to prepare a milk pudding which has superior eating qualities to those previously prepared and in addition is free from added phosphates.

The present invention provides a dry mixture which will dissolve in milk and subsequently set to a jelly, containing an alkali alginate, an alkali carbonate and a substance or substances capable of slowly combining with the carbonate in the presence of moisture. If such a mixture is dissolved in fresh cold milk it will on standing form a jelly. The composition of the mixture should be such that the alginate dissolves substantially completely in the milk before setting takes place to any appreciable extent.

In the preparation of mixtures according to this invention, it is necessary to ensure that the mixture is such that the alginate will dissolve sufficiently quickly. This can be done by using a sodium or potassium alginate of sufficiently low calcium content preferably below 0.2% and in a fine state of subdivision. Milling to pass a sieve having 200 mesh to the lineal inch is advantageous, and finer milling is desirable.

Again a sufficiently rapid rate of solution of the alginate can be ensured by first forming a homogeneous mixture of the alginate and other materials, for example by making them into a solution, or by kneading in the form of a moist paste and then drying and reducing to a powder of fine particles. One method of drying and reducing to fine particles at the same time is by spray-drying solution.

Cane sugar, glucose or other edible water soluble carbohydrates can also be mixed with the alginate.

Although the reactions taking place during the setting of the mixture to a jelly do not necessarily involve a reaction between the alkali carbonate and the substance which is capable of reacting slowly with it, and this invention is not limited to any particular mechanism of chemical reaction, the final composition of the mixture after it has set is such that it could have been obtained by such a reaction, and the substances introduced to bring about setting can be chosen on the basis of their capability of taking part in such a reaction.

The substance capable of reaction with the alkali carbonate after the mixture has been dissolved in the milk can be one which yields an acid which slowly neutralizes the sodium carbonate in the presence of water. It can be, for example, potassium hydrogen tartrate, or it can be a substance which hydrolyses to form an acid, as for example glucono delta lactone.

Alternatively, the reactive substance can be one which will remove carbonate ions by precipitation to give an insoluble carbonate. This is most conveniently brought about by including a suitable calcium salt in the mixture. To be capable of reacting with the carbonate this salt must have a solubility product greater than that of calcium carbonate, namely $10^{-9}$. On the other hand it must yield calcium ions slowly so that substantially all the alginate is dissolved before appreciable reaction takes place. We have found that this is most conveniently achieved by using calcium salts which are sparingly soluble in water. Suitable salts have a solubility within the range 1 to 30 gms. per liter of water at 25° C. Calcium sulphate, calcium malate and calcium malonate are particularly suitable.

It will be understood that in the solution before setting takes place, the carbonate ions may be largely combined with calcium ions from the milk, so that the effect of an acidic substance will be at least in part the release of calcium ions which were temporarily rendered unavailable by the carbonate. When setting is brought about by added calcium ions these may in fact react largely with the alkali alginate which is in solution. Whatever the course of the reaction, the final result is that the alginate is present in the form of calcium alginate, and the carbonate has either been converted to alkali bicarbonate or to calcium carbonate, the alkali ions being associated with anions introduced with the acid yielding substance or the sparingly soluble calcium salt. The same overall composition would be given by the alginate reacting with the calcium in the milk and the setting reagent with the alkali carbonate.

The quantity of the substance which yields acid or calcium is adjusted to give a jelly of the required consistency and rate of formation. Increasing the amount gives a stiffer jelly and a faster set but it will be realized that if the setting rate is such that it prevents solution of the alginate or allows insufficient time for mixing and pouring the product, the jelly will not have a uniform texture and will tend to collapse. Suitable quantities are set out in the examples given below.

A combination of an acid yielding and a calcium yielding substance, selected from those mentioned above can be used. In this case the quantity of each will be less than either when used alone, and is easily determined by experiment.

Sugar which has not already been wet mixed with the alginate, and in an amount suitable for sweetening the product is mixed dry with the other ingredients. It is preferably in the form of a powder known as pulverized sugar. Cold milk soluble flavors and color in powder form can also be included in the mixture.

It is to be understood that in place of fresh cold milk, reconstituted milk obtained by dissolving milk powder in water can be used, and an alternative means of carrying out the invention is to mix a milk powder which is soluble in cold water with the other ingredients, and to dissolve the whole mixture in cold water. A cold soluble modified starch can also be included in the mixture if desired.

The following examples serve to illustrate various possible mixtures for use in accordance with the present invention:

Example I

Sodium alginate prepared by known methods and containing a calcium content of only 0.15% was dried to a moisture content of 8% and milled to pass a sieve with 300 openings to the linear inch. A 1% solution (D.M. basis) of this alginate in water had a viscosity of 60 centistokes at 25° C. It was then mixed in a dry powder mixer to give a powder having the following composition:

| | Parts by weight |
|---|---|
| Sodium alginate | 100 |
| Sodium carbonate anhydrous (100 mesh) | 35 |
| Calcium sulphate dihydrate (200 mesh) | 70 |
| Pulverized sugar | 2000 |
| Vanilla flavor | 5 |
| Yellow color | 10 |
| | 2220 |

55 grams of this mixture was added to 250 cc. of cold milk and dissolved by agitating with a rotary whisk for 30 seconds. The liquid, which had then thickened appreciably, was poured into a mold. After half an hour the jelly could be turned out.

Example II

Sodium alginate prepared as in Example I was used to make the following mixture:

| | Parts by weight |
|---|---|
| Sodium alginate | 100 |
| Sodium carbonate, anhydrous | 35 |
| Glucono delta lactone (100 mesh) | 150 |
| Pulverized sugar | 2000 |
| Butterscotch flavor | 10 |
| Butterscotch color | 15 |
| | 2310 |

58 grams of this powder were whisked into 250 cc. of cold milk for 30 seconds and the solution poured into a mold. The jelly could be turned out in half an hour.

Example III

Sodium alginate prepared as in Example I was used to make the following mixture:

| | Parts by weight |
|---|---|
| Sodium alginate | 100 |
| Sodium carbonate, anhydrous | 35 |
| Calcium malate (200 mesh) | 26 |
| Pulverized sugar | 2000 |
| Caramel flavor | 10 |
| Caramel color | 10 |
| | 2171 |

54 grams of this mixture were used with 250 cc. of milk as before.

Example IV

To 200 lbs. of moist sodium alginate (containing 80 lbs. of the dry solid) was added 32 lbs. of anhydrous sodium carbonate and the mixture was made uniform by the action of a mixer of the Werner Pfleiderer type. The resulting paste was broken up and dried and then milled to pass a 200 mesh B.S.S. sieve. The product had a moisture content of 8% and a solution in water made up to contain 1% of dry sodium alginate had a viscosity of 50 centistokes at 25° C. The powder was used to make a mixture of the following composition:

| | Parts by weight |
|---|---|
| Sodium alginate-carbonate powder | 140 |
| Potassium hydrogen tartrate (200 mesh) | 60 |
| Calcium sulphate dihydrate (200 mesh) | 20 |
| Pulverized sugar | 2000 |
| Vanilla flavor | 5 |
| Yellow color | 10 |
| | 2235 |

56 grams of this powder were added to 250 cc. of cold milk and dissolved by wisking for 30 seconds. The liquid was poured into a mold and could be turned out after half an hour.

Example V

A solution containing 1.5% by weight of dry sodium alginate and a sufficient quantity of commercial glucose syrup to give 6% by weight of glucose solids in the solution was converted to a powder by spray drying. The powder was used to make a mixture of the following composition:

| | Parts by weight |
|---|---|
| Alignate-glucose powder | 500 |
| Sodium carbonate anhydrous | 40 |
| Potassium hydrogen tartrate | 60 |
| Calcium sulphate dihydrate | 20 |
| Pulverized sugar | 1800 |
| Caramel flavor | 10 |
| Caramel color | 10 |
| | 2440 |

60 gm. of this powder were used with 250 cc. of milk as in the preceding examples.

Example VI

To 200 lbs. moist sodium alginate (containing 80 lbs. of the dry solid) was added 24 lbs. of anhydrous sodium carbonate and 80 lbs. of pulverized sugar. The pasty mass was made uniform by the action of a mixer of the Werner Pfleiderer type and was then broken up, dried to 95% dry matter content and milled to pass a 200 mesh B.S.S. sieve. A solution of the product in water, made up to contain 1% by weight of dry sodium alginate, had a viscosity of 65 centistokes at 25° C. The powder was used to make a mixture of the following composition:

| | Parts by weight |
|---|---|
| Sodium alginate-sugar-sodium carbonate powder | 230 |
| Potassium hydrogen tartrate (200 mesh) | 100 |
| Pulverized sugar | 1900 |
| Banana flavor | 10 |
| Yellow color | 10 |
| | 2250 |

56 grams of this powder were used with 250 cc. of cold milk as in the previous examples.

Example VII

Sodium alginate-sugar-sodium carbonate powder was prepared, as in Example VI and used to make a mixture of the following composition:

| | Parts by weight |
|---|---|
| Sodium alginate-sugar-sodium carbonate powder | 230 |
| Potassium hydrogen tartrate (200 mesh) | 60 |
| Calcium sulphate dihydrate (200 mesh) | 10 |
| Pulverized sugar | 1900 |
| Caramel flavor | 10 |
| Caramel color | 10 |
| | 2220 |

56 gm. of this powder was used with 250 cc. of cold milk as in previous example.

Example VIII

A solution containing 1.5% by weight of sodium alginate, sufficient glucose syrup to give 6% glucose solids in the solution and 0.45% by weight of sodium carbonate was spray dried to give a powder containing 5% moisture.

The powder was used to make a mixture of the following composition:

| | Parts by weight |
|---|---|
| Alginate-glucose-sodium carbonate powder | 530 |
| Potassium hydrogen tartrate | 60 |
| Calcium sulphate dihydrate | 20 |
| Pulverized sugar | 1800 |
| Butterscotch flavor | 10 |
| Butterscotch color | 10 |
| | 2430 |

61 grams of this mixture were used with 250 cc. of milk as in the previous examples.

*Example IX*

To 200 lbs. of moist sodium alginate (containing 80 lbs. of the dry solid) was added 240 lbs. of pulverized sugar. The pasty mass was made uniform by the action of a mixer of the Werner Pfleiderer type and was then broken up, dried to 96% dry matter content and milled to pass a screen having 200 meshes to the linear inch. A solution of the product in water made up to contain 1% by weight of dry sodium alginate had a viscosity of 110 centistokes at 25° C.

The powder was used to make a mixture of the following composition:

| | Parts by weight |
|---|---|
| Sodium alginate-sugar powder | 400 |
| Sodium carbonate, anhydrous | 40 |
| Potassium hydrogen tartrate | 80 |
| Calcium sulphate dihydrate | 25 |
| Pulverized sugar | 1800 |
| Vanilla flavor | 5 |
| Yellow color | 10 |
| | 2360 |

55 grams of this mixture was used with 250 cc. of cold milk as in the preceding examples.

In the description of this invention and in the examples illustrating it, reference is made throughout to the use of cold milk. It should be understood that by "cold milk" is meant milk at ordinary room temperatures, that is approximately within the range 7° C. to 30° C. If very cold milk is used, as for example milk taken direct from the refrigerator, a considerable quantity of air is whipped into the pudding during the mixing process giving a light aerated texture. Although this is attractive from the point of view of eating quality, it may not have sufficient strength to be turned out of a mold and to retain its shape. If aeration of the pudding during mixing is to be avoided, the temperature of the milk should be above 7° C.

We claim:
1. A product which dissolves in milk and will subsequently set to a jelly comprising a dry powdered mixture of an alkali alginate, an alkali carbonate and calcium sulphate.
2. A product as claimed in claim 1 in which the alkali alginate is sodium alginate.
3. A product as claimed in claim 1 in which the alkali carbonate is sodium carbonate.
4. A product as claimed in claim 1 in which the alkali alginate is so finely divided as to pass a screen having 100 meshes to the lineal inch.
5. A product as claimed in claim 4 in which the alkali alginate is milled to pass a screen having 240 meshes to the lineal inch.
6. A product as claimed in claim 1, wherein the alkali alginate is one which has a calcium alginate content not exceeding 0.2%.
7. A product which dissolves in milk and will subsequently set to a gel comprising a dry powdered mixture of an alkali alginate, alkali carbonate and calcium sulphate, and a slowly soluble edible acidic material.
8. A product as claimed in claim 7 in which the acidic material is potassium hydrogen tartrate.
9. A process of preparing a product which dissolves in milk and subsequently sets to a jelly, comprising taking an alkali alginate in the dry condition and milling it dry to pass a screen having 240 meshes to the lineal inch and thereafter mixing it with an alkali carbonate and calcium sulphate.
10. A process of preparing a product which dissolves in milk and will subsequently set to a jelly, comprising taking an alkali alginate in a moist condition, first mixing it with an alkali carbonate and sugar, then drying and milling to pass a screen having at least 100 meshes per lineal inch and then adding calcium sulphate.
11. A process as claimed in claim 10 in which the milling operation is such as to bring the material to a fineness not less than that which will pass a screen having 200 meshes to the lineal inch.
12. A process for the preparation of a product which when mixed with milk will cause it to set to a jelly consisting in producing a solution containing an alkali alginate mixed with glucose syrup spray-drying the solution to produce a highly subdivided product and mixing with an alkali carbonate and calcium sulphate.
13. A process as claimed in claim 12 wherein the alkali carbonate instead of being mixed with the spray-dried material is included in the solution which is spray dried.

References Cited in the file of this patent
UNITED STATES PATENTS

| 2,441,729 | Steiner | May 18, 1948 |
| 2,808,337 | Gibsen | Oct. 1, 1957 |